(12) United States Patent
Aoki

(10) Patent No.: US 9,932,002 B2
(45) Date of Patent: Apr. 3, 2018

(54) SEAT CONTROL SYSTEM AND WIRE HARNESS

(71) Applicant: Yazaki Corporation, Tokyo (JP)

(72) Inventor: Yoshihito Aoki, Susono (JP)

(73) Assignee: Yazaki Corporation, Tokyo (JP)

( * ) Notice: Subject to any disclaimer, the term of this patent is extended or adjusted under 35 U.S.C. 154(b) by 283 days.

(21) Appl. No.: 15/043,642

(22) Filed: Feb. 15, 2016

(65) Prior Publication Data
US 2016/0159299 A1    Jun. 9, 2016

Related U.S. Application Data

(63) Continuation of application No. PCT/JP2014/074649, filed on Sep. 18, 2014.

(30) Foreign Application Priority Data

Sep. 18, 2013   (JP) .................. 2013-192691

(51) Int. Cl.
*B60R 16/03* (2006.01)
*B60R 16/02* (2006.01)
*B60R 16/037* (2006.01)

(52) U.S. Cl.
CPC ...... *B60R 16/0315* (2013.01); *B60R 16/0207* (2013.01); *B60R 16/03* (2013.01); *B60R 16/037* (2013.01)

(58) Field of Classification Search
CPC ................................................. B60R 16/0315
USPC ....................................................... 307/10.1
See application file for complete search history.

(56) References Cited

U.S. PATENT DOCUMENTS

| 7,356,714 B2 | 4/2008 | Nagasawa et al. |
| 2011/0301782 A1* | 12/2011 | Yamamoto ............. B60N 2/002 |
| | | 701/1 |

FOREIGN PATENT DOCUMENTS

| JP | 10-022006 A | 1/1998 |
| JP | 2003-158821 A | 5/2003 |
| JP | 2004-268630 A | 9/2004 |
| JP | 2006-062593 A | 3/2006 |

(Continued)

OTHER PUBLICATIONS

Notification of Reasons for Refusal dated Jun. 6, 2017, issued for the Japanese patent application No. 2013-192691 and English translation thereof.

(Continued)

*Primary Examiner* — Joseph Chang
(74) *Attorney, Agent, or Firm* — Locke Lord LLP

(57) ABSTRACT

A wire harness includes a power source line and a signal line which connect a control ECU for controlling motor units disposed on each seat of a vehicle, switch units for operating the motor units and the motor units to each other. Drive connectors in which drive circuits for driving the motor units are incorporated are provided to terminals of the wire harness on a motor units side. Signal connectors for transmitting operation signals indicative of states of the switch units are mounted on terminals of the wire harness on a switch units side. The drive connectors and the signal connectors are provided as parts separate from each other, and the control ECU, the drive connectors and the signal connectors are provided that multiplex communication is possible among them through the signal line.

7 Claims, 5 Drawing Sheets

(56) References Cited

FOREIGN PATENT DOCUMENTS

| | | |
|---|---|---|
| JP | 2007-112181 A | 5/2007 |
| JP | 2008-155906 A | 7/2008 |

OTHER PUBLICATIONS

International Search Report dated Oct. 21, 2014, issued for PCT/JP2014/074649.
Office Action dated Nov. 21, 2016, issued for the Chinese patent application No. 201480045365.4 and English translation thereof.

\* cited by examiner

SEAT CONTROL SYSTEM AND WIRE HARNESS

TECHNICAL FIELD

The present invention relates to a seat control system and a wire harness structural body, and more particularly to a seat control system for controlling loads disposed on respective seats of a vehicle and a wire harness structural body used in the seat control system.

BACKGROUND ART

Conventionally, as the above-mentioned seat control system, there has been proposed a seat control system shown in FIG. 5, for example. As shown in the drawing, the conventional seat control system 100 includes: a plurality of motors M which form loads disposed on respective seats of a vehicle; a control ECU 101 for controlling these motors M; and a wire harness W connected between the control ECU 101 and the motors M.

The wire harness W is branched in plural corresponding to the respective seats, and a connector C10 is mounted on respective terminals of branched wire harnesses. The plurality of motors M disposed on the respective seats is connected to the connector C10. In the connector C10, a communication circuit capable of performing multiplex communication with the control ECU 101, a drive circuit for driving the motors M and a sensor circuit for detecting drive amounts of the motors M are incorporated (none of them shown in the drawing).

The communication circuit incorporated in the connector C10 performs communication with the control ECU 101, and drives the motors M in accordance with commands from the control ECU 101. The connector C10 is also connected to switches for operating the motors M, and outputs operation signals of the switches to the control ECU 101. The control ECU 101 performs a control of the respective motors M based on the operation signals.

As described above, the connector C10 relays the communication between the control ECU 101 and the plurality of motors M and hence, it is unnecessary to respectively establish connection between the respective motors M and the control ECU 101 thus enhancing wiring property of the wire harness W and suppressing the increase of a weight of the wire harness W.

The seat control system 100 described above is an effective means for relaying signal levels. In driving electric loads such as the motors M or the like as described above, however, it is necessary to incorporate the drive circuit and the censor circuit in the connector C10 and hence, the connector C10 becomes large-sized thus giving rise to a drawback that mountability of the seat control system is lowered. Further, it is necessary to change the specifications of connectors in conformity with the specifications of loads mounted on a vehicle thus also giving rise to a drawback that the standardization of the seat control system becomes difficult.

SUMMARY OF INVENTION

Technical Problem

Accordingly, it is an object of the present invention to provide a seat control system capable of easily realizing miniaturization and standardization of connectors and a wire harness structural body incorporated in the seat control system.

Solution to Problem

The invention according to a first aspect in order to solve the above-mentioned issue is a seat control system including: a plurality of loads disposed on seat of a vehicle; a control unit for controlling the loads; a operation units for operating the loads disposed on the seat of the vehicle; a wire harness formed of power source line and signal line connecting the control unit, the operation unit and the loads; a drive connector mounted on a terminal of the wire harness on the load side, the drive connector incorporating a drive circuit for driving the loads therein; and a signal connector mounted on a terminal of the wire harness on the operation unit side, the signal connector being capable of transmitting an operation signal indicative of state of the operation unit, wherein the drive connector and the signal connector are provided as parts separate from each other, and the control unit, the drive connector and the signal connector are configured to perform multiplex communication through the signal line.

The invention according to a second aspect is the seat control system according to the first aspect, wherein the plurality of loads, the drive connector and the signal connector are disposed on a plurality of seats, and the control unit is configured to transmit a drive command of the loads to the drive connector such that the loads disposed on the plurality of seats are not driven simultaneously.

The invention according to a third aspect is the seat control system according to the second aspect, wherein priority is set in advance with respect to the plurality of seats, and the control unit, upon determination that the operation unit disposed on the plurality of seats is operated based on an operation signal from the signal connector, transmits a drive command of the load only to the signal connector corresponding to the seats having higher order in priority among the signal connectors to which the operation signal is transmitted.

The invention according to a fourth aspect is the seat control system according to any one of the first to third aspects, wherein the plurality of drive connectors is provided corresponding to the one seat.

The invention according to a fifth aspect is a wire harness structural body including: a wire harness formed of a power source line and a signal line connecting a control unit for controlling a plurality of loads disposed on a seat of a vehicle, and an operation unit and the loads disposed on the seat of the vehicle; a drive connector mounted on a terminal of the wire harness on the load side, the drive connector incorporating a drive circuit for driving the loads therein; and a signal connector disposed on a terminal of the wire harness on the operation unit side, the signal connector being capable of transmitting an operation signal indicative of state of the operation unit, wherein the drive connector and the signal connector are provided as parts separate from each other, and the control unit, the drive connector and the signal connector are configured to perform multiplex communication through the signal line.

Advantageous Effects of Invention

As has been described heretofore, according to the inventions described in the first to fifth aspects, the drive connector for loads which requires the drive circuit and the signal connector which transmits an operation signal are provided as parts separate from each other and hence, the respective connectors can be miniaturized. Further, even when the number of loads mounted on the vehicle is increased, it is sufficient to add the drive connectors or to change the signal connectors corresponding to the increase of the number of loads while maintaining the existing drive connectors and hence, the standardization of the drive connector can be realized.

According to the invention described in the second aspect, the control unit controls the drive connector such that the loads disposed on the plurality of seats respectively are not simultaneously driven. With such a configuration, a maximum value of a current which flows through a power source line of the wire harness can be suppressed and hence, a diameter of an electric line can be reduced thus realizing the reduction of weight of the seat control system.

According to the invention described in the third aspect, even when the operation units disposed on the plurality of seats are simultaneously operated, a load corresponding to the seat having higher priority can be driven with priority.

According to the invention described in the fourth aspect, the plurality of drive connectors can be provided corresponding to the number of loads.

DESCRIPTION OF EMBODIMENTS

Figure 1:
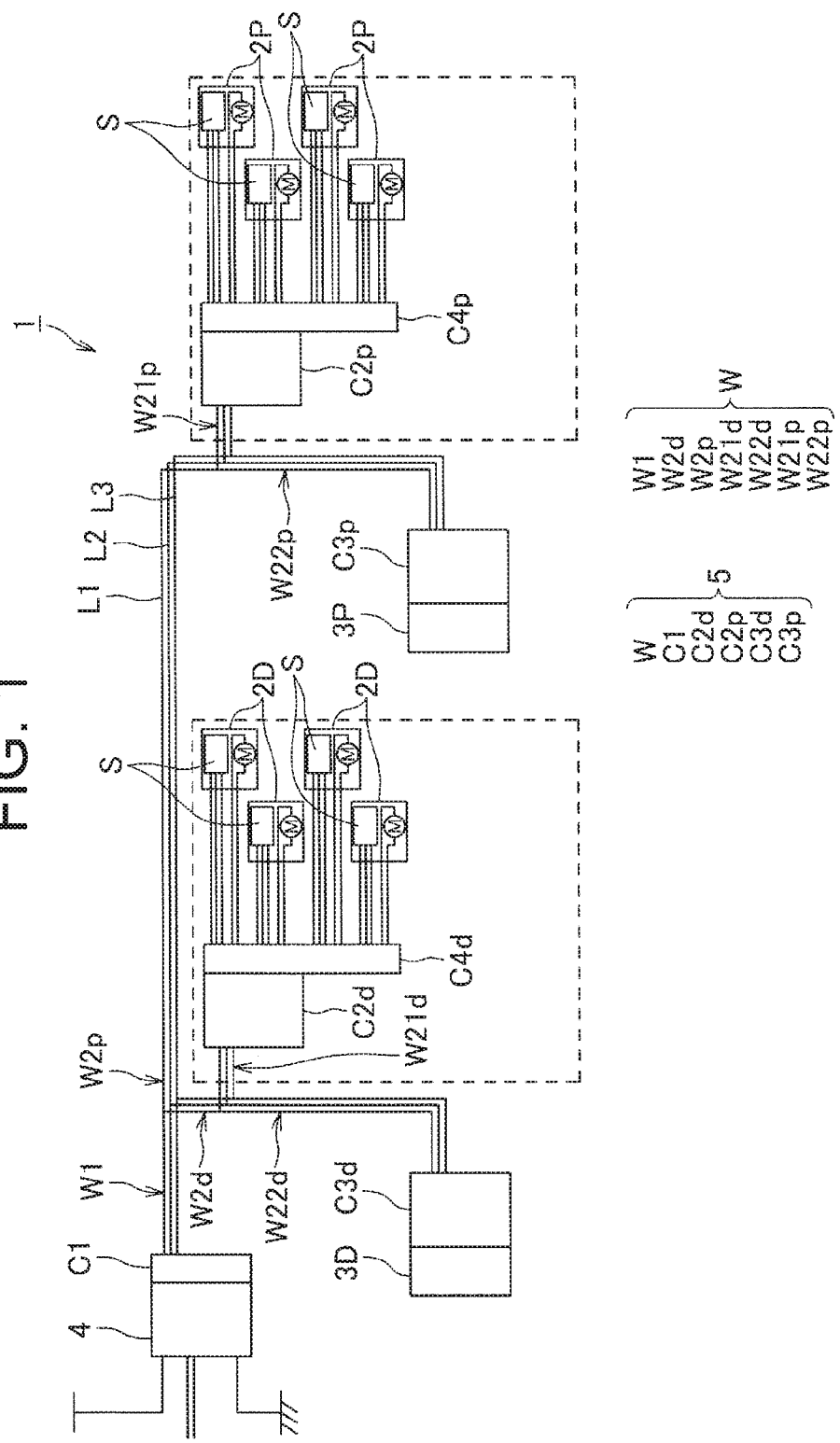
FIG. 1 is a circuit diagram showing one embodiment of a seat control system of the present invention.

Hereinafter, a seat control system which incorporates a wire harness structural body of the present invention is described hereinafter with reference to FIG. 1 to FIG. 3. As shown in the drawing, the seat control system 1 includes: motor units 2D and 2P which form a plurality of loads respectively disposed on, for example, a D seat and a P seat of a vehicle; switch units 3D and 3P which form operation units for the motor units 2D and 2P; a control ECU 4 which controls the plurality of motor units 2D and 2P in response to operations of the switch units 3D and 3P; and a wire harness structural body 5 which connects the motor units 2D and 2P, the switch units 3D and 3P and the control ECU 4 to each other.

The motor units 2D are disposed on the D seat of the vehicle, and the motor units 2P are disposed on the P seat of the vehicle . These motor units 2D and 2P are units for adjusting the positions of the D seat and the P seat in the longitudinal direction and the inclination of backrests of the D seat and the P seat seats, and are respectively mounted on the D seat and the P seat . The motor units 2D and 2P are respectively formed of : a motor M for driving each seat; and a sensor S for outputting a sensor signal corresponding to a displacement amount of the seat when the motor M is driven.

The above-mentioned switch unit 3D is disposed on the D seat of the vehicle, and the switch unit 3P is disposed on the P seat of the vehicle. These switch units 3D ad 3P are respectively formed of a plurality of switches which are operated by respective users seated on the D seat and the P seat respectively at the time of adjusting positions of the seats in the longitudinal direction and the inclination of back rests of the seats.

The control ECU 4 is formed of a microcomputer which controls the entire seat control system 1, and is provided with an external connector (not shown in the drawing) which is connected to the wire harness structural body 5 described later.

The wire harness structural body 5 is formed of: a wire harness W; and a connector C1, drive connectors C2d and C2p, signal connectors C3d and C3p which are respectively connected to terminals of the wire harness W.

The wire harness W is formed of: a main line W1 drawn out from the control ECU 4; two branched lines W2d, W2p which are branched from the main line W1 corresponding to the D seat and the P seat; two branched lines W21d and W22d which are branched from the branched line W2d corresponding to respective units 2D, 3D disposed on the D seat; and two branched lines W21p and W22p which are branched from the branched line W2p corresponding to respective units 2P, 3P disposed on the P seat.

The connector C1 is mounted on one end of the main line W1, and the main line W1 is connected with the control ECU 4 through the connector connection. The drive connectors C2d and C2p are respectively mounted on terminals of the branched lines W21d and W21p (=terminals on a motor unit 2D, 2P side). The drive connectors C2d and C2p are connectors which are respectively connected to unit-side connectors C4d and C4p respectively connected to the plurality of motor units 2D. The signal connectors C3d and C3p are respectively mounted on terminals of the branched lines W22d and W22p (=terminals on a switch unit 3D, 3P side). The signal connectors C3d and C3p are connectors respectively connected to the switch units 3D and 3P.

These main line W1, branched lines W2d, W21d, W22d, W2p, W21p and W22p are respectively formed of: a power source line L1 and a ground line L2 provided for supplying a power source to the respective motor units 2D, 2P and the switch units 3D, 3P; and a signal line L3 through which various signals such as control signals from the control ECU 4 and operation signals from the signal connectors C3d, C3p are transmitted by multiplex transmission (serial transmission).

By connecting the connector C1 of the wire harness structural body 5 having the above-mentioned configuration to the control ECU 4, by connecting the drive connectors C2d, C2p to the motor units 2D, 2P, and by connecting the signal connectors C3d, C3p to the switch units 3D, 3P, a power source is supplied to the respective units 2D, 2P, 3D and 3P through the power source line L1 and the ground line L2 from the control ECU 4 and, at the same time, the control ECU 4, the drive connectors C2d, C2p, and the signals C3d, C3p are communicably connected to each other through the signal line L3.

Next, the configurations of the drive connectors C2d, C2p and signal connectors C3d, C3p are described with reference to FIG. 2. As shown in the drawing, these connectors C2d, C2p, C3d, C3p are respectively formed of: an outer housing 6 indicated by a dotted line; a power source terminal fitting T1, a ground terminal fitting T2 and a signal terminal fitting T3 (FIG. 3) which are connected to the wire harness W; terminal fittings T4 respectively connected to respective units 2D, 2P, 3D, 3P; and an electronic printed circuit board 7 housed in the outer housing 6.

The outer housing 6 is formed into a flat cylindrical shape using an insulating synthetic resin, and includes a hood portion 6A and a board housing chamber 6B which is contiguously formed with the hood portion 6A and in which the electronic printed circuit board 7 is housed as integral parts thereof. The above-mentioned power source terminal fitting T1, ground terminal fitting T2 and signal terminal fitting T3 are respectively formed of a well-known crimp terminal or the like, and are respectively electrically connected to the power source line L1, the ground line L2 and the signal line L3 which form the wire harness W. The terminal fittings T1 to T4 are connected to the electronic printed circuit board 7.

One end of the terminal fitting T4 is connected to the electronic printed circuit board 7, and the other end of the terminal fitting T4 is housed in the inside of the hood portion 6A. When the above-mentioned connectors C2d, C2p, C3d, C3p are respectively connected to the units 2D, 2P, 3D, 3P through the connector connection, power source is supplied to the respective units 2D, 2P, 3D, 3P through the terminal fittings T4 and, at the same time, various signals are inputted to and outputted from the electronic printed circuit board 7.

Figure 3A:
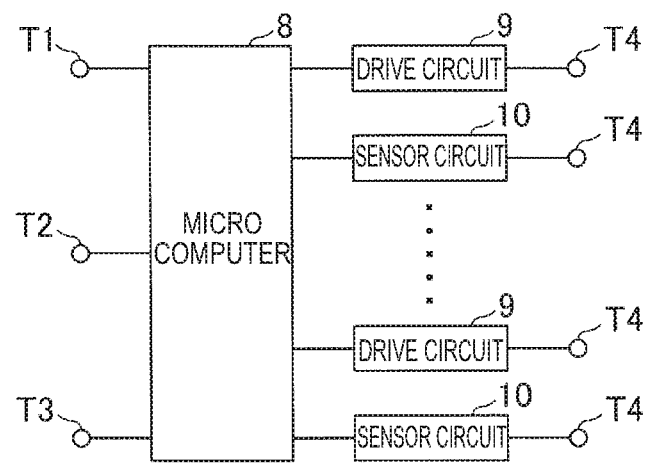
FIG. 3A is an electric constitutional view of the drive connector shown in FIG. 1.

As shown in FIG. 3A, the microcomputer (hereinafter referred to as micon) 8, a drive circuit 9 for driving the motor M, and a sensor circuit 10 which obtains a displacement amount of the seat upon reception of a sensor signal from the sensor S are mounted on the electronic printed circuit board 7 of the drive connector C2d, C2p.

The micon 8 is electrically connected to the above-mentioned terminal fittings T1 to T3 so as to receive the supply of a power source, and is communicably connected with the control ECU 4 through the signal line L3. The micon 8 is connected to the drive circuit 9, and drives the motor M by controlling the drive circuit 9 in accordance with a control signal transmitted from the control ECU 4. Further, the micon 8 is connected to the sensor circuit 10, and transmits a displacement amount of the seat obtained by the sensor circuit 10 to the control ECU 4.

Figure 3B:
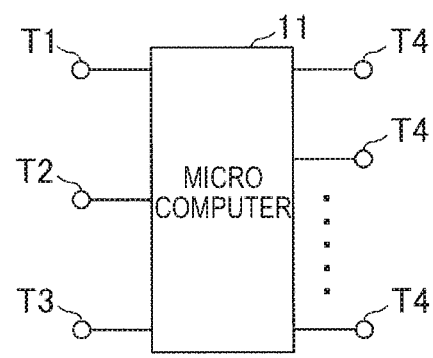
FIG. 3B is an electric constitutional view of the signal connector shown in FIG. 1.
Figure 4:
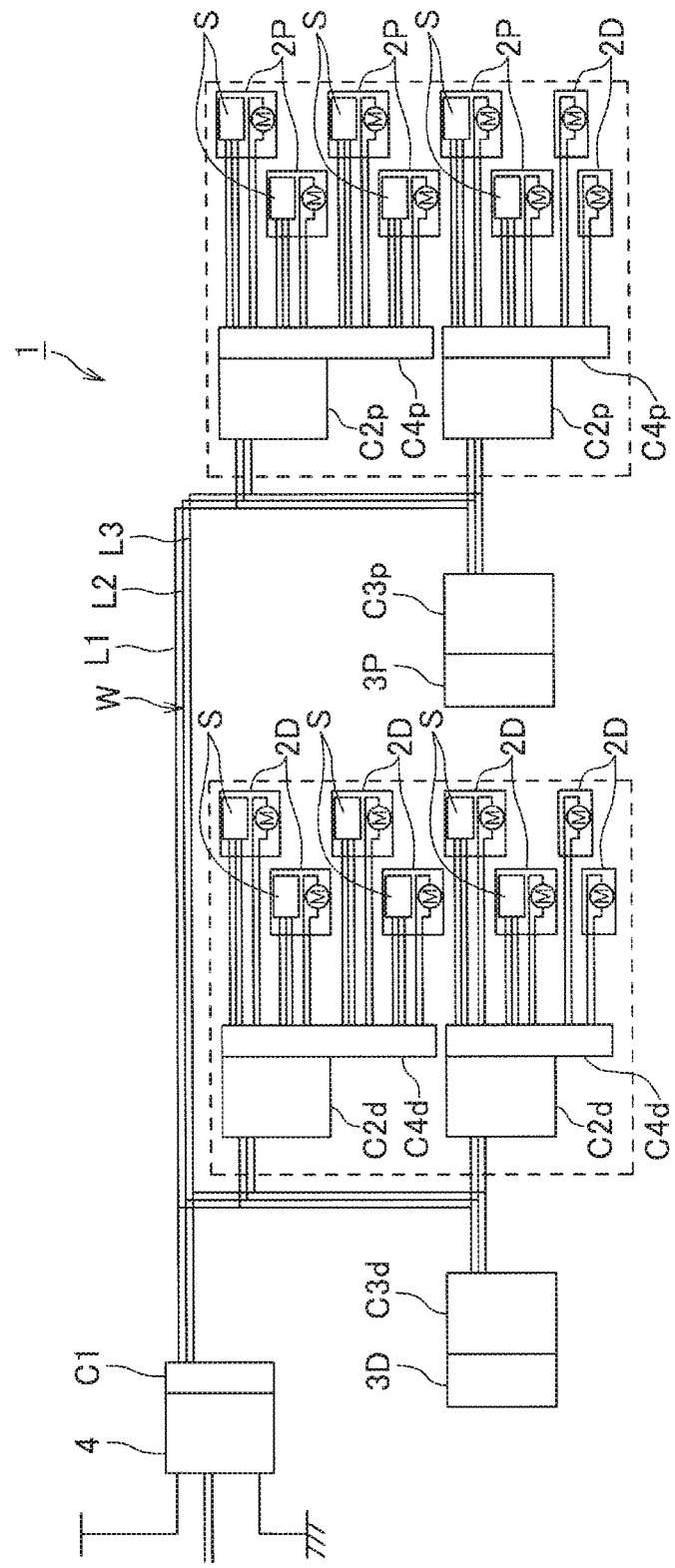
FIG. 4 is a circuit diagram of a seat control system according to another embodiment.

As shown in FIG. 3B, a micon 11 is mounted on the electronic printed circuit boards 7 of the above-mentioned signal connectors C3d, C3p respectively. The micon 11 is connected to the terminal fittings T1 to T3, receives the supply of a power source, and is communicably connected to the control ECU 4 through the signal line L3. Further, the micon 11 is connected to the terminal fittings T4 thus being connected to a switches of the switch units 3D and 3P so that the micon 11 can detect a state of the switches. A micon 12 outputs an operation signal indicative of a detected switch state to the control ECU 4.

Next, the manner of operation of the seat control system 1 having the above-mentioned configuration is described. Firstly, the basic manner of operation is described. When a user operates the switch which constitutes the switch unit 3D, 3P, the micon 11 of the signal connector C3d, C3p connected to the operated switch detects such a switch operation, and transmits an operation signal to which an ID of the operated switch is added to the control ECU 4.

The control ECU 4 can grasp which switch of which seat is operated from the ID added to the operation signal, and outputs a drive command to the motor unit 2D, 2P of the seat which corresponds to the switch. When the drive connector C2d, C2p receives a drive command which is addressed to the motor unit 2D, 2P connected to the drive connector C2d, C2p, the drive connector C2d, C2p drives the motor unit 2D, 2P which is the destination of the drive command by controlling the drive circuit 9. At this stage of operation, the drive connector C2d, C2p may transmit a displacement amount of the seat obtained by the sensor circuit 10 to the control ECU 4, and the control ECU 4 may transmit a drive command such that the seat takes a seat position preliminarily set based on the displacement amount of the seat.

The control ECU 4 may control the drive connectors C2d, C2p such that the motor units 2D, 2P respectively disposed on a plurality of seats are not driven simultaneously. To be more specific, priority is assigned to the D seat or the P seat in advance. In this embodiment, the description is made assuming that the D seat has priority over the P seat. When the control ECU 4 determines that the switch units 3D, 3P respectively disposed on the D seat and the P seat are simultaneously operated based on operation signals from the signal connectors C3d, C3p, the control ECU 4 transmits a drive command only to the D seat having higher priority by comparing the operation signals respectively transmitted from the signal connectors C3d, C3p.

Because of such an operation, although a user seated on the D seat can drive own seat by operating the switch unit 3D, a user seated on the P seat cannot drive own seat even when the switch unit 3P is operated. In this case, the seat control system may inform a user that the driving of the P seat is restricted by an alarm sound, a meter or an information terminal such as a navigation system. Further, the seat control system 1 may centrally control the motor units 2D, 2P disposed corresponding to all seats by operating a switch unit (not shown in the drawing) disposed on a driver's seat.

According to the above-mentioned embodiment, the drive connectors C2d, C2p for the motor units 2D, 2P each of which requires the drive circuit 9 and the signal connectors C3d, C3p each of which transmits operation signals are provided as parts separate from each other and hence, the respective connectors can be miniaturized. Further, even when the number of motor units 2D, 2P mounted on the vehicle is increased, it is sufficient to add the drive connectors C2d, C2p or to change the signal connectors C3d, C3p corresponding to the increase of the number of the motor units 2D, 2P while maintaining the existing drive connectors C2d, C2p.

Figure 2:
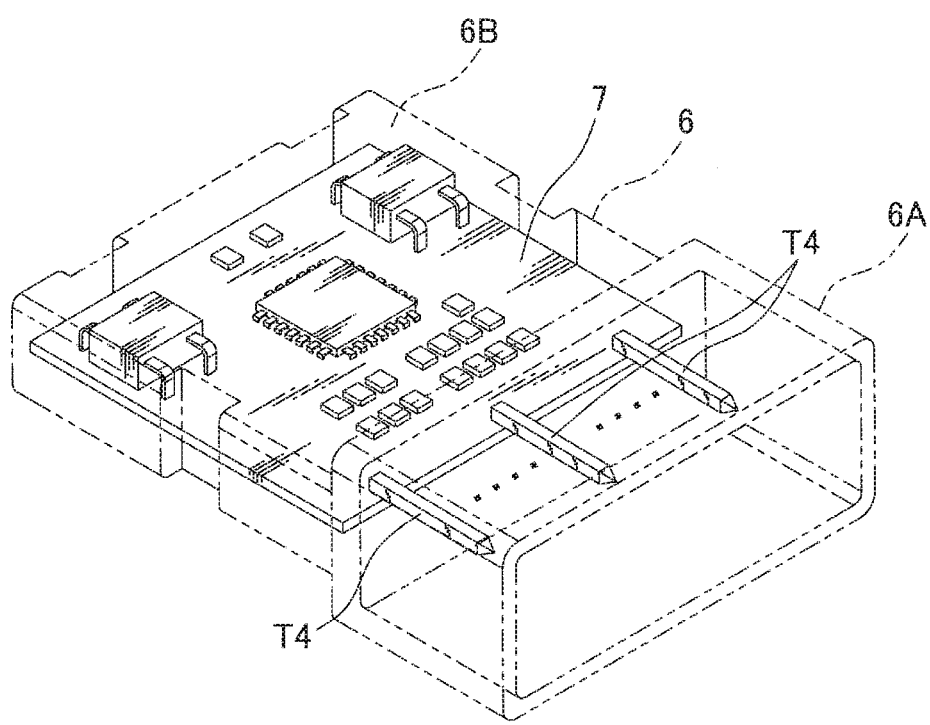
FIG. 2 is a perspective view of a drive connector and a signal connector shown in FIG. 1.
Figure 5:
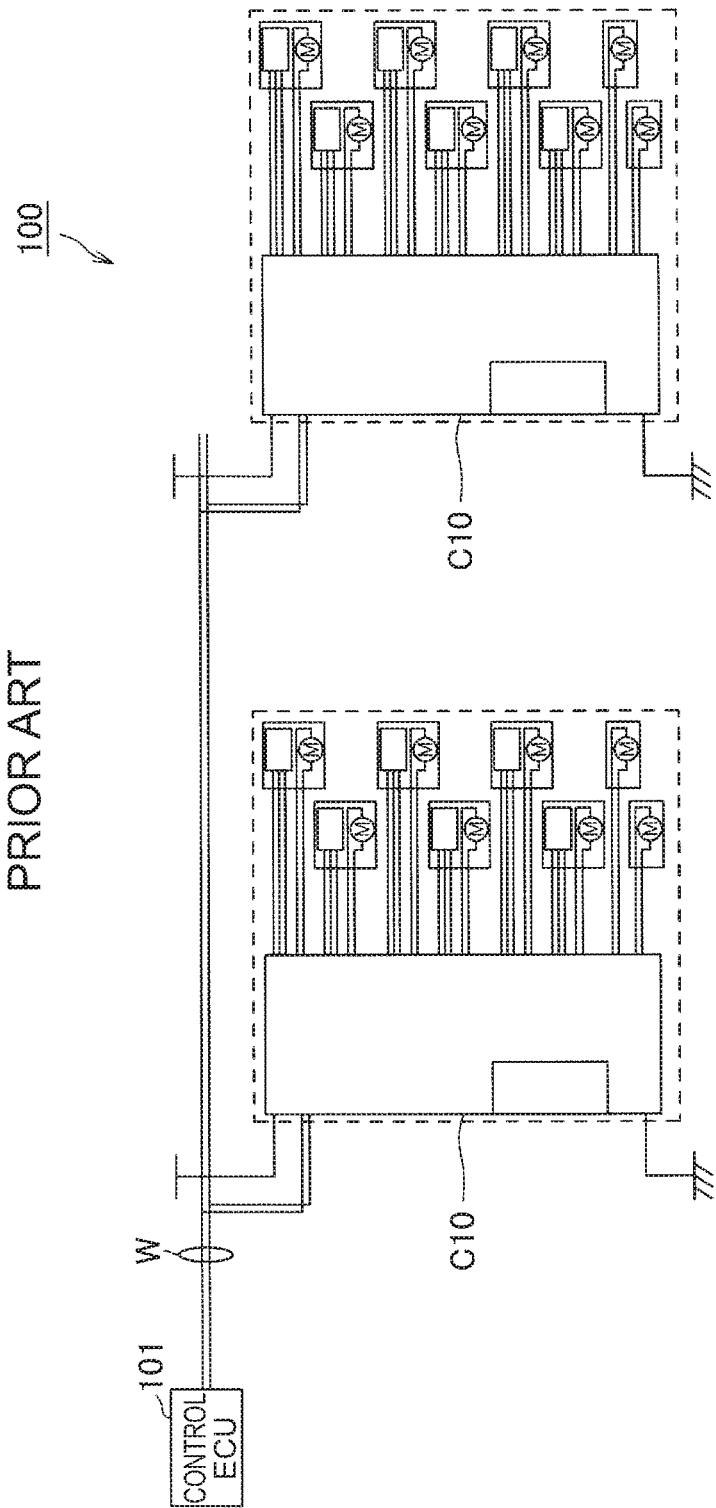
FIG. 5 is a circuit diagram showing one example of a conventional seat control system.

For example, when the number of motor units 2D, 2P mounted on a vehicle is increased more than the number of motors mounted on a standard vehicle shown in FIG. 2, as shown in FIG. 5, it is sufficient to add drive connectors C2d, C2p having the same configuration as the existing drive connectors C2d, C2p. That is, it is sufficient to provide the plurality of drive connectors C2d, C2p having the same configuration corresponding to the number of the motor units 2D, 2P thus realizing the standardization of the drive connectors C2d, C2p.

According to the above-mentioned embodiment, the control ECU 4 controls the drive connectors C2d, C2p such that the motor units 2D, 2P respectively disposed on the D seat and the P seat are not simultaneously driven. With such a configuration, as a current which flows through the power source line L1 of the wire harness W, it is sufficient to make a current which can drive the motor unit 2D, 2P corresponding to one seat flow through the power source line L1. Accordingly, a maximum value of a current can be suppressed and hence, a diameter of an electric line can be reduced thus realizing the reduction of weight of the seat control system.

According to the above-mentioned embodiment, even when the switch units 3D, 3P are operated simultaneously at the D seat and the P seat, the motor unit 2D, 2P corresponding to the seat having higher priority can be driven with priority.

According to the above-mentioned embodiment, when the switch units 3D, 3P are operated simultaneously at the D seat and the P seat, only the motor unit 2D, 2P corresponding to the seat having higher priority is driven. However, the present invention is not limited to such an operation. For example, the seat control system may assign priority to the switch unit which is operated first out of the switch units 3D, 3P disposed on the D seat and the P seat respectively.

According to the above-mentioned embodiment, the description is made with respect to the example where, in the seat control system 1 of the present invention, the drive connector C2d, C2p and the signal connectors C3d, C3p are disposed on the D seat and the P seat respectively. However, the present invention is not limited to such a configuration. The drive connector and the signal connector maybe disposed only one seat, and may be disposed on three or more seats.

In the above-mentioned embodiment, the motor M is used as a load. However, the load is not limited to the motor M. A heater or a lighting apparatus disposed on the respective seats may be the load.

Further, the above-mentioned embodiment merely shows the representative configuration of the present invention, and the present invention is not limited to the above-mentioned embodiment. That is, various modifications can be carried out without departing from the gist of the present invention.

REFERENCE SIGNS LIST

1: seat control system
2D: motor unit (load)
2P: motor unit (load)
3D: switch unit (operation unit)
3P: switch unit (operation unit)
4: control ECU (control unit)
5: wire harness structural body
W: wire harness
C2d: drive connector
C2p: drive connector
C3d: signal connector
C3p: signal connector
L1: power source line
L3: signal line

The invention claimed is:

1. A seat control system comprising:
a plurality of loads disposed on a seat of a vehicle;
a control unit for controlling the loads;
an operation unit for operating the loads disposed on the seat of the vehicle;
a wire harness formed of a power source line and a signal line connecting the control unit, the operation unit and the loads;
a drive connector mounted on a terminal of the wire harness on the load side, the drive connector incorporating a drive circuit for driving the loads therein; and
a signal connector mounted on a terminal of the wire harness on the operation unit side, the signal connector being capable of a transmitting operation signal indicative of state of the operation unit, wherein
the drive connector and the signal connector are provided as parts separate from each other, and
the control unit, the drive connector and the signal connector are configured to perform multiplex communication through the signal line.

2. The seat control system according to claim 1, wherein the plurality of loads, the drive connector and the signal connector are disposed on a plurality of seats, and
the control unit is configured to transmit a drive command of the loads to the drive connector such that the loads disposed on the plurality of seats are not driven simultaneously.

3. The seat control system according to claim 2, wherein priority is set in advance with respect to the plurality of seats, and
the control unit, upon determination that the operation unit disposed on the plurality of seats is operated based on operation signal from the signal connector, transmits a drive command of the load only to the signal connector corresponding to the seat having higher order in priority among the signal connectors to which the operation signal is transmitted.

4. The seat control system according to claim 1, wherein the plurality of drive connectors is provided corresponding to the one seat.

5. The seat control system according to claim 2, wherein the plurality of drive connectors is provided corresponding to the one seat.

6. The seat control system according to claim 3, wherein the plurality of drive connectors is provided corresponding to the one seat.

7. A wire harness comprising:
a wire harness formed of power source line and signal line connecting a control unit for controlling a plurality of loads disposed on seat of a vehicle, and an operation unit and the loads disposed on the seat of the vehicle;
a drive connector mounted on a terminal of the wire harness on the load side, the drive connector incorporating a drive circuit for driving the loads therein; and
a signal connector disposed on a terminal of the wire harness on the operation unit side, the signal connector being capable of transmitting an operation signal indicative of state of the operation unit, wherein
the drive connector and the signal connector are provided as parts separate from each other, and
the control unit, the drive connector and the signal connector are configured to perform multiplex communication through the signal line.

\* \* \* \* \*